(12) United States Patent
Mutlu et al.

(10) Patent No.: US 9,901,993 B2
(45) Date of Patent: Feb. 27, 2018

(54) END MILL

(71) Applicant: Gühring KG, Albstadt (DE)

(72) Inventors: Murat Mutlu, Chemnitz (DE); Stefan Weimann, Hirschaid (DE); Clemens Gall, Ebersdorf (DE)

(73) Assignee: Guehring KG, Albstadt (DE)

( * ) Notice: Subject to any disclaimer, the term of this patent is extended or adjusted under 35 U.S.C. 154(b) by 195 days.

(21) Appl. No.: 14/636,776

(22) Filed: Mar. 3, 2015

(65) Prior Publication Data
US 2015/0251254 A1 Sep. 10, 2015

(30) Foreign Application Priority Data
Mar. 7, 2014 (DE) .................. 10 2014 103 103

(51) Int. Cl.
*B23C 5/10* (2006.01)
(52) U.S. Cl.
CPC .......... *B23C 5/10* (2013.01); *B23C 2210/203* (2013.01); *B23C 2210/282* (2013.01); *B23C 2220/04* (2013.01); *B23C 2250/16* (2013.01); *Y10T 407/1948* (2015.01); *Y10T 409/303752* (2015.01)
(58) Field of Classification Search
CPC .......... B23C 2200/083; B23C 2200/28; B23C 2200/283; B23C 2200/286; B23C 2200/32; B23C 2222/88; B23C 2210/0485; B23C 2210/0414; B23C 2210/0492; B23C 2210/282; Y10T 407/1946; Y10T 407/1948; Y10T 407/195; Y10T 407/1952; Y10T 407/1954; Y10T 407/1956; Y10T 407/1958; Y10T 407/196; Y10T 407/1962; Y10T 407/1964; Y10T 407/1966
USPC ...................................... 407/53–63
See application file for complete search history.

(56) References Cited

U.S. PATENT DOCUMENTS 2,129,417 A * 9/1938 Gase .................. B23C 5/10
144/221
4,963,059 A * 10/1990 Hiyama .............. B23C 5/003
407/11

(Continued)

*Primary Examiner* — Daniel Howell
*Assistant Examiner* — Nicole N Ramos
(74) *Attorney, Agent, or Firm* — Burr & Brown, PLLC

(57) ABSTRACT

Described is an end mill with four straight front cutting edges arranged on a front side and a corresponding number of circumferential cutting edges that each emanate from the outer nose of the front cutting edges and are separated from each other by flutes. One of the front cutting edges passes over into a second cutting edge via a free surface intersecting line. The additional front cutting edges lying between the latter in the cutting direction are offset relative to each other by a first angular pitch of 180°, and end before the middle. So that the end mill can be used in an especially advantageous manner for incorporating dimensionally and positionally precise pilot holes or chamfering curved work piece surfaces, the first front cutting edge is offset relative to the second front cutting edge in the cutting direction by a second angular pitch ranging between 173° and 177°, preferably between 174° and 176°, wherein the first front cutting edge is offset relative to the next additional front cutting edge in the cutting direction by a third angular pitch ranging between 90° and 94°, preferably between 91° and 93°.

23 Claims, 5 Drawing Sheets

(56) References Cited

U.S. PATENT DOCUMENTS

| | | | | |
|---|---|---|---|---|
| 5,094,573 | A * | 3/1992 | Hougen | B23B 51/0406 407/53 |
| 5,236,291 | A * | 8/1993 | Agapiou | B23B 51/02 408/211 |
| 6,056,485 | A * | 5/2000 | Magill | B23C 5/10 407/54 |
| 6,435,780 | B1 * | 8/2002 | Flynn | B23C 5/10 407/53 |
| 7,753,624 | B2 * | 7/2010 | Gunther | B23C 5/10 407/30 |
| 2006/0188345 | A1 * | 8/2006 | Greenwood | B23C 5/003 407/54 |
| 2007/0154272 | A1 * | 7/2007 | Wells | B23C 5/10 407/54 |
| 2007/0297864 | A1 * | 12/2007 | de Boer | B23C 5/10 407/54 |
| 2009/0148296 | A1 * | 6/2009 | Barnat | B23C 3/30 416/216 |
| 2010/0226726 | A1 * | 9/2010 | Strasmann | B23C 5/003 407/54 |
| 2011/0217132 | A1 * | 9/2011 | Wells | B23C 5/10 407/54 |
| 2014/0227049 | A1 * | 8/2014 | Budda | B23C 5/10 407/54 |
| 2014/0227050 | A1 * | 8/2014 | Budda | B23C 5/10 407/54 |

\* cited by examiner

END MILL

BACKGROUND OF THE INVENTION

1. Field of the Invention

The invention relates to an end mill.

2. Description of Related Art

Such end mills are basically known, for example from DE 103 25 600 B4 or the "Pilot Mill" journal of the applicant from 2013.

Milling tools of this kind have more recently been used when holes, including deep holes, have to be introduced at an inclination to a work piece surface. In this case, the face mill is used to "chamfer" the work piece surface or provide it with a pilot hole, which during the ensuing hole machining process serves as a guide for the drill, for example a gun drill.

The incremental improvements made to the materials for the used tools have also been accompanied by a rising quality of such pilot holes and chamfered surfaces. Improving the stiffness of the tools, for example by using hard materials like solid carbide (VHM), makes the dimensional accuracy of the pilot holes very good even if they are introduced into the work piece at a relatively large angle to the surface normal. Further improvements to machining quality in terms of position, dimensional accuracy and machined surface can be achieved by offsetting the front cutting edges relative to each other by unequal angular pitches (see DE 103 25 600 B4). Another measure involves assigning a negative front rake angle to the circumferential cutting edges to give the tool enough stability for machining high-strength and high-viscosity materials.

It has been found that the known geometries of the generic face mills are often inadequate for maintaining the required dimensional accuracies of the pilot holes, which by now range between 3 and 6 µm for permissible roundness deviations.

SUMMARY OF THE INVENTION

Therefore, the object of the invention is to create a generic milling tool with which pilot holes can be generated over its entire length at an unprecedented roundness.

This object is achieved with end mills as described herein.

The invention recognized that the abandonment of a point symmetry for the front cutting edges cutting over the middle combined with an angular pitch between the front cutting edges and other front cutting edges lying in between them other than 90° makes it possible to repress natural oscillations of the tool in such a way that maximum roundness accuracies of pilot holes can be maintained even if the pilot hole is introduced at a relatively large angle to the work piece normal. According to the invention, all angular pitches for the front cutting edges differ from each other. However, it was surprisingly discovered that the unequal cutting edge loads caused by the unequal pitch of the front cutting edges can even be positively used to improve the hole roundness via the combination with the other geometry parameters of the cutting edge configuration and design. Of course, the cutting edges must be stable enough to withstand the loads. However, this can be readily managed by selecting the suitable material for the cutting part of the mill, for example when using a hard material like a solid carbide or cermet material in this area. It is especially advantageous for the entire tool to consist of a hard material, for example solid carbide, because the stiffness of the shank in this way also helps improve the hole quality.

The further developments according to claims 2 and 4 yield an especially simple geometry for the front cutting edges.

Further developing claims 3 and 5 imparts a slightly positive front rake angle to the circumferential cutting edges. This measure is of special importance in particular for the initial phase of introducing the pilot hole at an inclination to the work piece surface, since at this moment the load on the circumferential cutting edges is to be kept as low as possible to avoid excessive deflections of the milling axis.

Further developing claim 6 improves the working accuracy of the end mill even more. By inclining at least the first and second front cutting edges, i.e., the two front cutting edges that cut over the middle, an additional centering function can be imparted to these front cutting edges. Tests performed by the applicant have established that there is a correlation between the inclination angle and pitch inequality of the front cutting edges. The higher the inclination angle of the front cutting edges running over the middle, the more unequal the pitch of the front cutting edges can be. It has been shown that already an inclination angle of 1° is enough to exert a tangible influence on the roundness of the pilot hole. It is especially preferred that the inclination measure 1.5°.

Even if the additional front cutting edges are also inclined relative to each other at a negative centering angle, the centering effect of the front cutting edges can be further strengthened. In the case according to claim 7 where such an inclination is selected for the additional front cutting edges, it is advantageous to adjust the inclination angle of these front cutting edges to that of the front cutting edges running over the middle.

It is basically possible to arrange the noses of the front cutting edges in different transversal planes. However, it becomes especially easy to manufacture the end mill when all noses of the front cutting edges lie in a shared transversal plane lying perpendicular on the milling axis according to claim 9.

The advantage resulting from the further development in claim 8 is that the pilot hole can be fabricated with an annular planar surface, which often is beneficial for continued machining or the function of the hole in the work piece.

The unequal pitch of the front cutting edges according to the invention can be generated in different ways. For example, it is possible to adjust the angles of twist of the individual circumferential cutting edges to each other, but introduce the flutes into the mill body with the unequal pitch. Another variant has to do with taking a uniform or point symmetrical distribution of flutes at a specific distance from the mill tip, and giving the angles of twist of the individual flutes a varying design. The pitch of the front cutting edges according to the invention is automatically achieved in this way.

The further developments in claims 13 and 14 improve the cutting behavior of the end mill at locations where the cutting speed is especially low. These measures make it possible to significantly reduce the feed force of the end mill while introducing a pilot hole.

BRIEF DESCRIPTION OF THE DRAWINGS

Schematic drawings will be used below to describe exemplary embodiments of the invention in greater detail. Shown on.

DETAILED DESCRIPTION OF THE INVENTION

Figure 1:
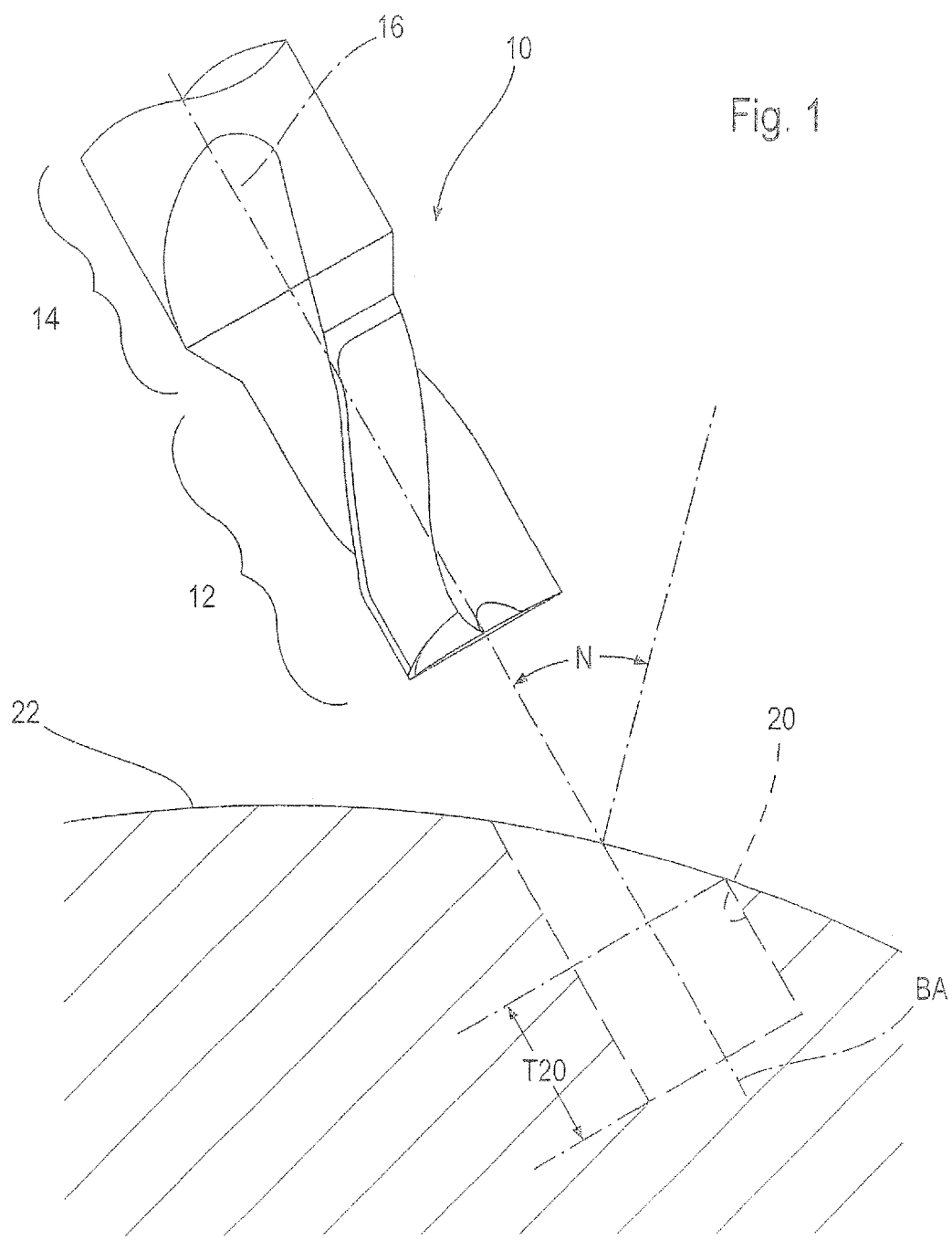
FIG. 1 is a schematic view of an end mill as typically positioned in relation to a work piece in preparation for introducing a pilot hole.

Labeled with reference number 10 on FIG. 1 is an end mill, which apart from conventional milling operations is also to be used for expanding holes, and also to pilot and chamfer in particular inclined work piece surfaces.

The dashed lines on FIG. 1 denote such a pilot hole 20, which is inclined at an inclination angle N relative to the work piece surface 22. The higher the inclination angle N, the more difficult it becomes to maintain a pilot hole having a sufficiently high accuracy with respect to the alignment of the hole axis and in terms of roundness in particular over the entire, fully formed hole depth T20. The dimensional accuracy of the pilot hole 20 is thus often required, since the pilot hole is used as a guide for the drill tool to be subsequently used in order to fabricate deeper holes. For example, this is why it has in the meantime become necessary at a hole diameter of 10 mm to keep the roundness deviations within a range of 3 to 6 μm over the entire length of the pilot hole 20.

The end mill 10 has an axis 16, a cutting part 12 and a shank 14, and is specifically designed as described in greater detail on FIGS. 2 to 5.

Figure 2:
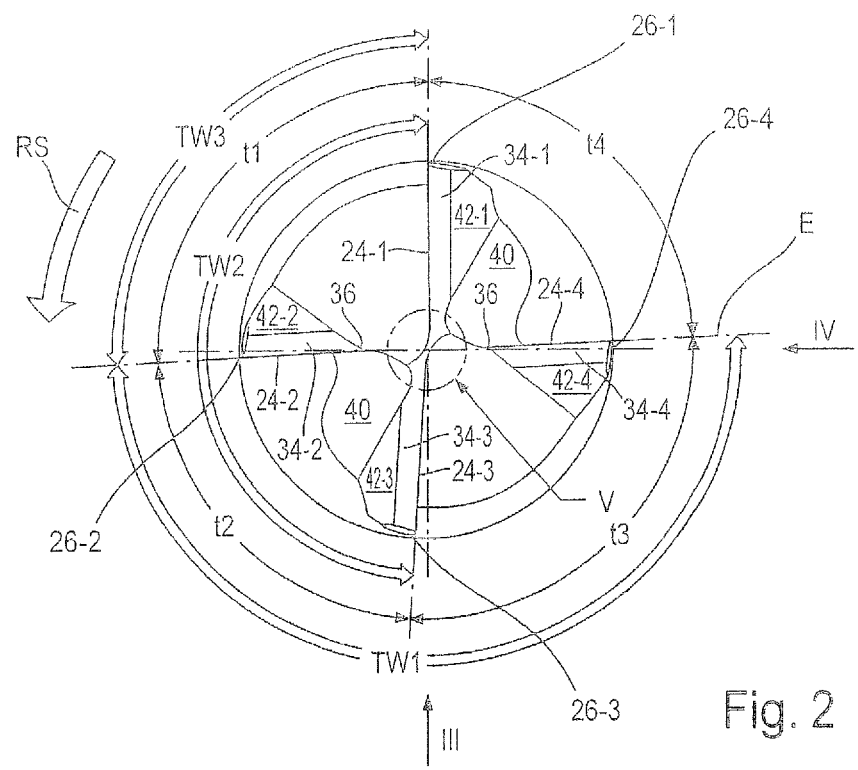
FIG. 2 is a front view of the end mill according to the invention.

As evident from FIG. 2, the end mill 4 has straight front cutting edges 24-1, 24-2, 24-3 and 24-4 with the noses 26-1 to 26-4, from which emanate respective circumferential cutting edges 28-1 to 28-4. Flutes 30 are formed between the circumferential cutting blades 28-1 to 28-4. In the exemplary embodiment shown, the circumferential cutting edges 28-1 to 28-4 follow a coiled progression, wherein the angle of twist WD is shown on FIG. 3 for the circumferential cutting edge 28-3. However, let it be emphasized at this juncture already that the invention can also be used in straight, fluted end mills.

Figure 5:
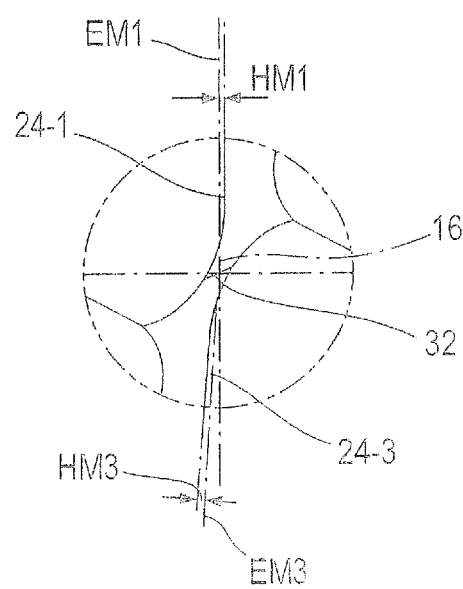
FIG. 5 is the detail "V" on FIG. 2.

The front cutting edges 24-1 and 24-3 extend "over the middle", so to speak, and are only delineated from each other by a free surface intersecting line 32 (see detail on FIG. 5). Reference numbers 34-1 and 34-3 denote the free surfaces of the front cutting edges 24-1 and 24-3.

The additional front cutting edges 24-2 and 24-4 are located between the front cutting edges 20-1 and 24-3 in the cutting direction. These front cutting edges end before the middle at point 36, since they are stripped via a reduction 38 of the front cutting edge adjacent opposite the cutting direction, with which the progression of the front cutting edge 24-1 and 24-3 cutting over the middle is simultaneously corrected. The front cutting edges 24-2 and 24-4 are offset relative to each other by a first angular pitch TW1 of 180°.

The distinctive feature of the end mill according to FIGS. 2 to 5 lies in the fact that very special pitch correlations are present for the position of the front cutting edges. In particular, front cutting edge 24-3 is offset relative to front cutting edge 24-1 in the cutting direction RS by a second angular pitch TW2 that ranges between 173 and 177°, preferably between 174° and 176°, for example measuring 175°. Further, the next front cutting edge 24-2 lying in the cutting direction toward the front cutting edge 24-1 is offset relative to the front cutting edge 24-1 by a third angular pitch TW3 that ranges between 90° and 94°, preferably between 91° and 93°, for example measuring 92°.

This yields a front cutting edge pitch with angular pitches t1, t2, t3 and t4, wherein angles t1 to t4 are all different. For example, angular pitch t1 measures 92°, angular pitch t2 measures 83°, angular pitch t3 measures 97°, and angular pitch t4 measures 88°.

As further visible from FIG. 2 and in particular from the detail according to FIG. 5, the front cutting edges 24-1 and 24-3 each run parallel to a median plane EM1 or EM3 running through the milling axis 16. It is especially preferred that the respective front cutting edges 24-1 or 24-3 lie a small distance HM1 or HM3 behind the accompanying median plane EM1 or EM3 in the cutting direction, which yields a slightly positive front rake angle on the accompanying circumferential cutting edge 38-1 or 38-3. It has been shown that, depending on the nominal diameter of the end mill, offsets HM1 or HM3 on the order of several $\frac{1}{10}^{th}$ of a mm are already sufficient to have a positive influence on the arising cutting forces.

Figure 8:
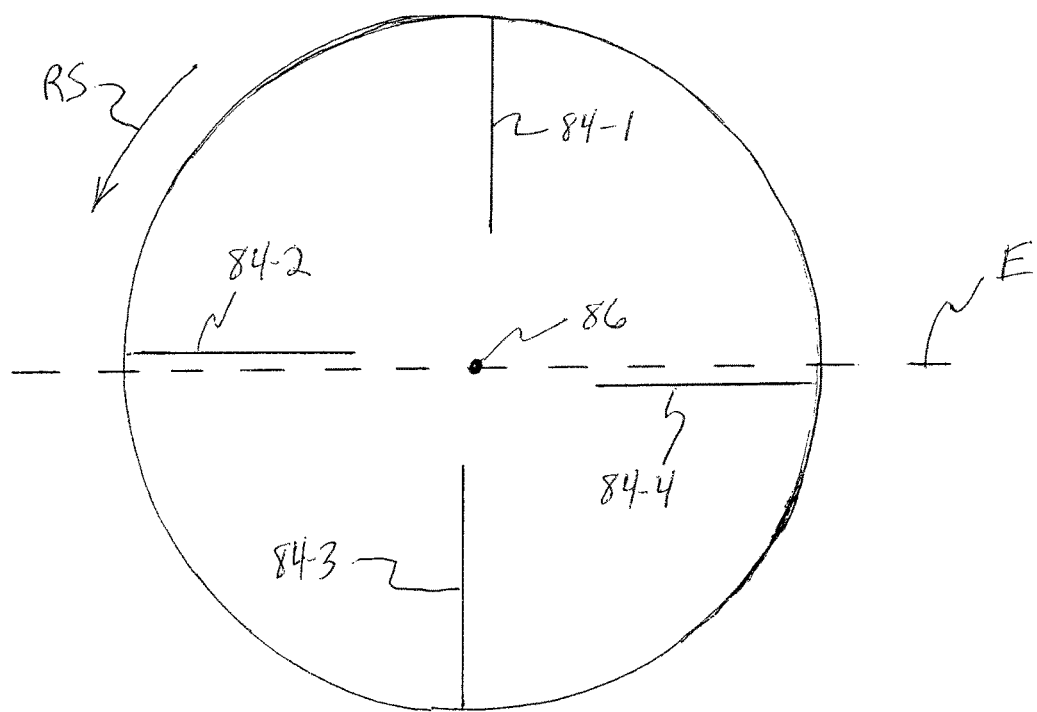
FIG. 8 is a schematic view of an end mill that comprises a first front cutting edge 84-1, a second front cutting edge 84-3, a third front cutting edge 84-2, and a fourth front cutting edge 84-4.

Similarly to the front cutting edges 24-1 and 24-3 that cut over the middle, the front cutting edges 24-2 and 24-4 also run along a straight line and parallel to a shared median plane that passes through the milling axis 16 and is not shown in any greater detail on the figures, but essentially coincides with the plane E depicted on FIG. 2, in which lie the front cutting edges 24-2 and 24-4. It can also be provided with respect to these front cutting edges 24-2 and 24-4 that they lie a short distance HM behind this median plane E in the cutting direction. FIG. 8 is a schematic view of an end mill that comprises a first front cutting edge 84-1, a second front cutting edge 84-3, a third front cutting edge 84-2, and a fourth front cutting edge 84-4. The end mill has a direction of rotation RS and an axis 86.

The configuration described above with the different angular pitches t1 to t4 and the special angular pitch deviating from 180° for the front cutting edges 24-1 and 24-3 cutting over the middle make it possible to advantageously stem the natural oscillating behavior of the end mill in such a way that pilot holes can be fabricated with an extremely good roundness, even if the angle of inclination N (see FIG. 1) assumes values up to in excess of 30°.

In order to further improve the dimensional and positional accuracy of the pilot hole, the end mill according to the application exhibits the following additional feature:

Both front cutting edges 24-1 and 24-3 cutting over the middle proceed from the accompanying nose 26-1 or 26-3 and each run inclined relative to a transversal plane ET standing perpendicular on the milling axis 16 (see FIG. 4) at a negative centering angle WZ, which ranges between 0.5° and 3.5°, preferably between 1° and 3°, for example by 1.5° in the direction of the milling shank.

Figure 3:
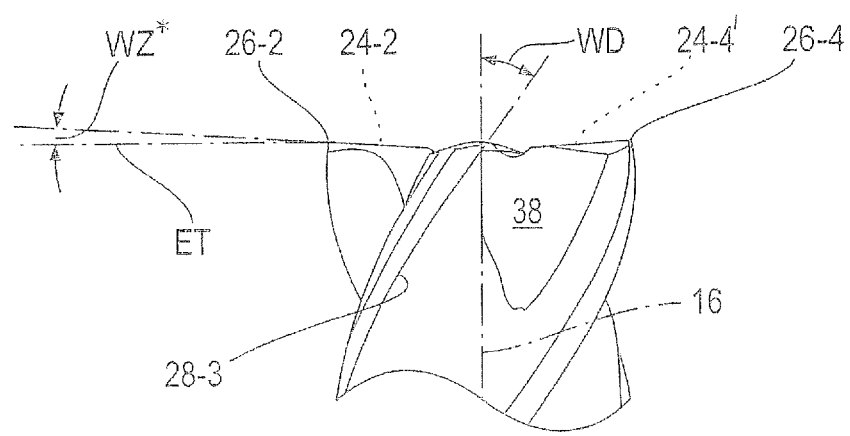
FIG. 3 is the view according to "III" on FIG. 2.
Figure 4:
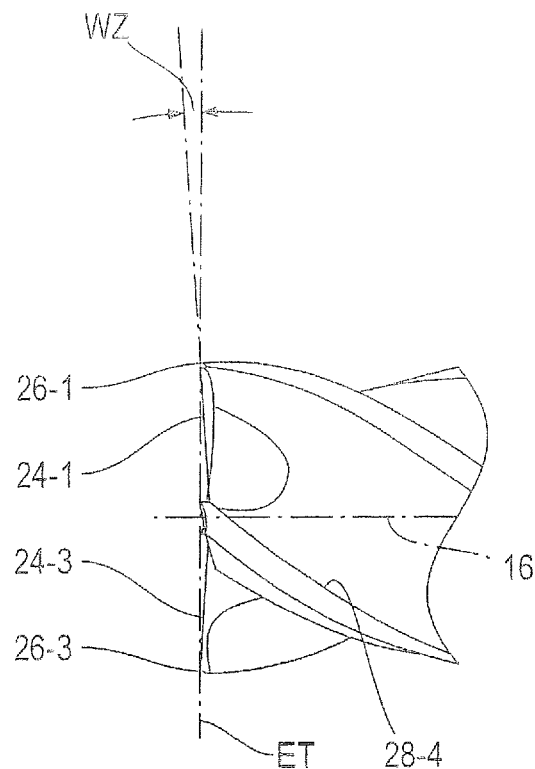
FIG. 4 is the view according to "IV" on FIG. 2.

As evident from FIG. 3, the arrangement selected for the front cutting edges 24-2 and 24-4 is similar in the depicted embodiment according to FIGS. 2 to 5, meaning that they are also inclined relative to each other in such a way as to include a centering angle WZ* with the transversal plane ET standing perpendicular on the milling axis 16, which exhibits the same order of magnitude as centering angle WZ, i.e., lies within a range of 0.5° to 3.5°.

To simplify production, the noses 26-1 to 26-4 lie in a shared transversal plane ET.

The shortened front cutting edges 24-2 and 24-4 have also been corrected via reduction 40, so that they run along a straight line.

The reductions 38 and 40 are preferably introduced in such a way as to yield a positive front rake angle over the entire length of the front cutting edges, which ranges between 0 and 5°, preferably between 0 and 3°.

As further evident from FIG. 2, all front cutting edges 24-1 to 24-4 have two free surfaces, wherein the first free surface 34-1 to 34-4 is adjoined by a second free surface 42-1 to 42-4 that runs at an angle relative thereto.

The pitch of the front cutting edges 24-1 to 24-4 according to the invention shown on FIG. 2 can be achieved in different ways. One possibility is to design the flutes with the same pitch over their entire length in the tool. Another possibility is to design coiled flutes in such a way that the diametrically opposed flutes have a point symmetrical configuration as viewed in a transversal plane, which stands perpendicular on the drill axis 16 and preferably lies in the area of the cutting part 12, and that different angles of twist are selected for the circumferential cutting edges 28-1 and 28-3, wherein the angle of twist for the circumferential cutting edges 28-2 and 28-4 is simultaneously made to differ from the angle of twist for the circumferential cutting edges 28-1 and 28-3. For example, the angle of twist selected for the circumferential cutting edge 28-1 is thus larger or smaller than the angle of twist for the circumferential cutting edge 28-3. In addition, the angle of twist selected for the circumferential cutting edges 28-2 and 28-4 is larger or smaller than the angle of twist for the circumferential cutting edges 28-1 and 28-3.

The end mill 10 overall preferably consists of a high-strength material, for example HSS or HSSE, or of a hard material, for example solid carbide or a cermet material. In order to improve the service life, it may be advantageous to provide at least the cutting part 12 of the end mill with a coating, in particular a PVD coating.

Figure 6:
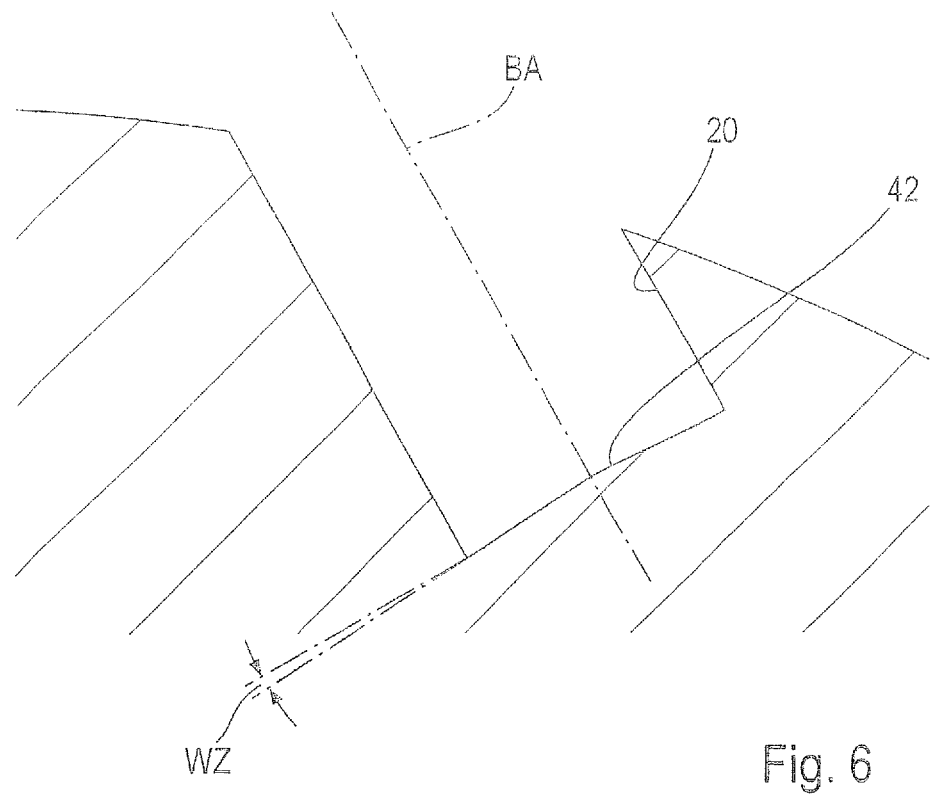
FIG. 6 is a schematic view of a pilot hole that can be manufactured with a tool according to the invention.

FIG. 6 schematically depicts the shape exhibited by a pilot hole 20 fabricated with an end mill 10 according to the invention. The cylindrical hole wall is adjoined by a hole bottom 42 in the form of a taper, wherein the taper angle is determined by the respective smaller inclination angle WZ or WZ* of the front cutting edges 24-1 to 24-4.

In another variant of the end mill according to the invention denoted on FIG. 3 by the dotted line with the front cutting edges 24-2' and 24-4', the angle WZ* in this case measures 0°, meaning that the front cutting edges 24-2' and 24-4' lie in the transversal plane ET running through the noses 26-1 to 26-4.

Figure 7:
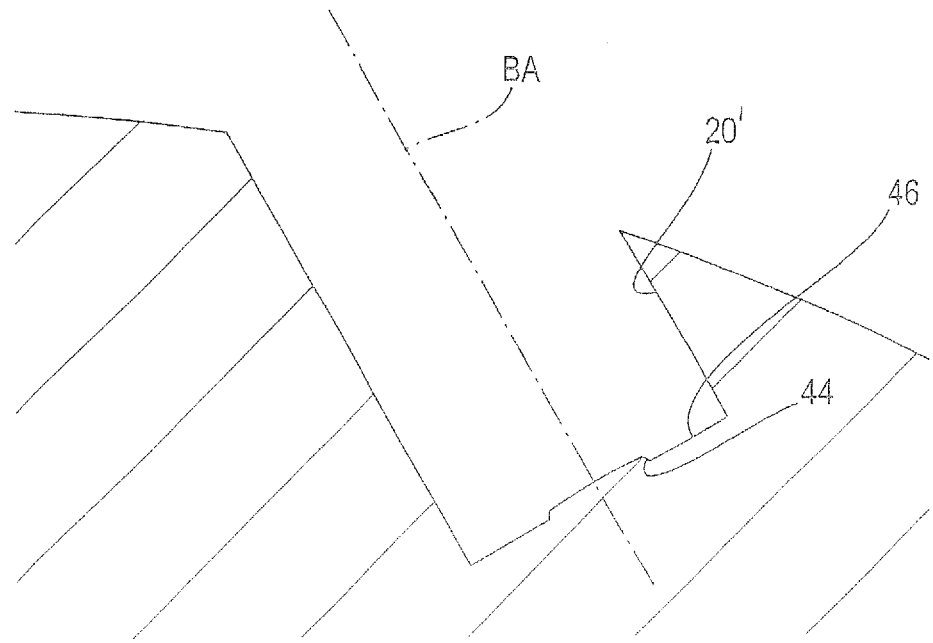
FIG. 7 is a schematic view of a pilot hole corresponding to FIG. 6, which can be manufactured with a somewhat modified tool according to FIGS. 2 to 5.

This configuration yields the contour of the pilot hole 20' schematically depicted on FIG. 7. In this case, the hole bottom is provided with a somewhat different shape. The cone shape defined by the inclined progression of the front cutting edges 24-1 and 24-3 that cut over the middle remains present in the center. An annular surface section 46 standing perpendicular on the hole axis BA adjoins this cone by way of a stage 44.

Tests were performed with end mills, which based on the embodiment described above were varied throughout the entire spectrum of pitch and inclination angle WZ. The tests revealed that pilot holes with a fully realized depth T20 ranging from 0.5 to 1×D (D denotes the nominal diameter of the end mill) can be formed, wherein values for the dimensional deviation of roundness at the deepest location and at the location next to the work piece surface range between 3 µm and 4 µm. These values can be achieved regardless of whether operations were performed wet or dry (MMS technology).

The invention thus provides an end mill with four straight front cutting edges arranged on a front side and a corresponding number of circumferential cutting edges that each emanate from the outer nose of the front cutting edges and are separated from each other by flutes. One of the front cutting edges passes over into a second cutting edge via a free surface intersecting line. The additional front cutting edges lying between the latter in the cutting direction are offset relative to each other by a first angular pitch of 180°, and end before the middle. So that the end mill can be used in an especially advantageous manner for incorporating dimensionally and positionally precise pilot holes or chamfering curved work piece surfaces, the first front cutting edge is offset relative to the second front cutting edge in the cutting direction by a second angular pitch ranging between 173° and 177°, preferably between 174° and 176°, wherein the first front cutting edge is offset relative to the next additional front cutting edge in the cutting direction by a third angular pitch ranging between 90° and 94°, preferably between 91° and 93°.

The invention claimed is:

1. An end mill comprising first, second, third and fourth straight front cutting edges arranged on a front side and a corresponding number of circumferential cutting edges that each emanate from a respective outer nose of the respective front cutting edges, the circumferential cutting edges separated from each other by flutes, wherein a first surface extends from the first front cutting edge to the second front cutting edge, the third front cutting edge is after the first front cutting edge and before the second front cutting edge in a circumferential cutting direction of the end mill, and the fourth front cutting edge is after the second front cutting edge and before the first front cutting edge in the circumferential cutting direction, the third and fourth front cutting edges offset relative to each other by a first angular pitch of 180°, the third and fourth front cutting edges each ending before reaching an axis of the end mill, the second front cutting edge offset relative to the first front cutting edge in the circumferential cutting direction by a second angular pitch in a range of from about 173° to about 177°, and the third front cutting edge offset relative to the first front cutting edge in the circumferential cutting direction by a third angular pitch in a range of from about 90° to about 94°.

2. The end mill according to claim 1, wherein the first front cutting edge runs parallel to a first plane in which the axis of the end mill extends, and the second front cutting edge runs parallel to a second plane in which the axis of the end mill extends.

3. The end mill according to claim 2, wherein the first front cutting edge is spaced from the first plane and behind the first plane in the circumferential cutting direction, and the second front cutting edge is spaced from the second plane and behind the second plane in the circumferential cutting direction.

4. The end mill according to claim 1, wherein the third and fourth front cutting edges are each parallel to a third plane in which the milling axis extends.

5. The end mill according to claim 4, wherein each of the third and fourth front cutting edges is spaced from the third plane, and each of the third and fourth front cutting edges is behind the third plane in the circumferential cutting direction.

6. The end mill according to claim 1, wherein each of the first and second front cutting edges extends from its respective outer nose at an angle in a range of from about 0.5° to about 3.5° relative to a fourth plane, the fourth plane perpendicular to the axis of the end mill.

7. The end mill according to claim 6, wherein each of the third and fourth front cutting edges also extends at an angle relative to the fourth plane.

8. The end mill according to claim 1, wherein each of the third and fourth front cutting edges extends in a fourth plane, the fourth plane perpendicular to the axis of the end mill.

9. The end mill according to claim 1, wherein each of the respective noses of the first, second, third and fourth front cutting edges is in a fourth plane, the fourth plane perpendicular to the axis of the end mill.

10. The end mill according to claim 1, wherein each of the circumferential cutting edges has a respective angle of twist, and the respective angles of twist for the circumferential cutting edges are identical.

11. The end mill according to claim 1, wherein each of the circumferential cutting edges has a respective angle of twist, and the angle of twist for the circumferential cutting edge emanating from the outer nose of the first front cutting edge differs from the angle of twist for the circumferential cutting edge emanating from the outer nose of the second front cutting edge.

12. The end mill according to claim 11, wherein the respective angles of twist for the circumferential cutting edges emanating from the respective outer noses of the third and fourth front cutting edges differ from at least one of the angles of twist for the circumferential cutting edges emanating from the respective outer noses of the first and second front cutting edges.

13. The end mill according to claim 1, wherein each of the front cutting edges has a respective reduction located adjacent the front cutting edge, opposite the cutting direction in relation to the front cutting edge.

14. The end mill according to claim 1, wherein each of the front cutting edges exhibits a positive front rake angle in a range of from about 0° to about 3° that extends until into a center region of the end mill.

15. The end mill according to claim 1, wherein the end mill consists of a hard material, at least in the area of a cutting section.

16. The end mill according to claim 1, wherein the end mill comprises a coating, at least in the area of a cutting section.

17. A method, comprising:
positioning a workpiece relative to an end mill such that at least one surface of the workpiece is inclined relative to a milling axis of the end mill, the end mill comprising first, second, third and fourth straight front cutting edges arranged on a front side and a corresponding number of circumferential cutting edges that each emanate from a respective outer nose of the respective front cutting edges, the circumferential cutting edges separated from each other by flutes, wherein a first surface extends from the first front cutting edge to the second front cutting edge, the third front cutting edge is after the first front cutting edge and before the second front cutting edge in a circumferential cutting direction of the end mill, and the fourth front cutting edge is after the second front cutting edge and before the first front cutting edge in the circumferential cutting direction, the third and fourth front cutting edges offset relative to each other by a first angular pitch of 180°, the third and fourth front cutting edges each ending before reaching an axis of the end mill, the second front cutting edge offset relative to the first front cutting edge in the circumferential cutting direction by a second angular pitch in a range of from about 173° to about 177°, and the third front cutting edge offset relative to the first front cutting edge in the circumferential cutting direction by a third angular pitch in a range of from about 90° to about 94°.

18. The end mill according to claim 1, wherein the second angular pitch is in a range of from about 174 degrees to about 176 degrees.

19. The end mill according to claim 1, wherein the third angular pitch is in a range of from about 91 degrees to about 93 degrees.

20. The end mill according to claim 6, wherein each of the first and second front cutting edges extends from its respective outer nose at an angle in a range of from 1 degree to 3 degrees relative to the fourth plane.

21. The end mill according to claim 6, wherein each of the first and second front cutting edges extends from its respective outer nose at an angle of about 1.5 degrees relative to the fourth plane.

22. The end mill according to claim 15, wherein the end mill consists of solid carbide.

23. The end mill according to claim 16, wherein the coating comprises PVD.

\* \* \* \* \*